US011368839B2

(12) United States Patent
Targali

(10) Patent No.: US 11,368,839 B2
(45) Date of Patent: Jun. 21, 2022

(54) SECURE PRIVACY PROVISIONING IN 5G NETWORKS

(71) Applicant: T-MOBILE USA, INC., Bellevue, WA (US)

(72) Inventor: Yousif Targali, Bellevue, WA (US)

(73) Assignee: T-MOBILE USA, INC., Bellevue, WA (US)

( * ) Notice: Subject to any disclaimer, the term of this patent is extended or adjusted under 35 U.S.C. 154(b) by 137 days.

(21) Appl. No.: 16/713,928

(22) Filed: Dec. 13, 2019

(65) Prior Publication Data

US 2021/0185523 A1 Jun. 17, 2021

(51) Int. Cl.
*H04W 12/02* (2009.01)
*H04W 12/72* (2021.01)
*H04W 12/0471* (2021.01)
*H04W 12/033* (2021.01)
*H04W 12/10* (2021.01)
*H04W 60/00* (2009.01)

(52) U.S. Cl.
CPC ......... *H04W 12/02* (2013.01); *H04W 12/033* (2021.01); *H04W 12/0471* (2021.01); *H04W 12/10* (2013.01); *H04W 12/72* (2021.01); *H04W 60/00* (2013.01)

(58) Field of Classification Search
CPC ............. H04W 12/72; H04W 12/0471; H04W 12/033; H04W 12/10; H04W 8/205; H04W 60/00; H04L 63/0428
USPC ........................................................ 726/26
See application file for complete search history.

(56) References Cited

U.S. PATENT DOCUMENTS

| 2019/0268759 | A1* | 8/2019 | Targali | H04W 8/18 |
| 2019/0335392 | A1 | 10/2019 | Qiao et al. | |
| 2019/0394640 | A1* | 12/2019 | Lee | H04L 61/6054 |
| 2020/0221281 | A1* | 7/2020 | Rajadurai | H04L 9/3242 |
| 2021/0409934 | A1* | 12/2021 | Tiwari | H04W 8/183 |

FOREIGN PATENT DOCUMENTS

| WO | WO-2019017689 A1 | 1/2019 |
| WO | WO-2019164759 A1 | 8/2019 |

OTHER PUBLICATIONS

Written Opinion of the International Searching Authority for PCT/US2020/013668 dated Apr. 9, 2020.
International Search Report for PCT/US2020/013668 dated Apr. 9, 2020.

* cited by examiner

*Primary Examiner* — Jeffrey C Pwu
*Assistant Examiner* — Samuel Ambaye
(74) *Attorney, Agent, or Firm* — Marshall, Gerstein & Borun LLP

(57) ABSTRACT

Systems and methods for provisioning user privacy parameters necessary for network security in 5G telecommunication networks are provided, such as the subscriber permanent identifier (SUPI), the routing indicator, the protection scheme identifier, or the home network key. In order to protect the user privacy parameters, the techniques disclosed herein use private and public key encryption, as well as integrity protection offered by 5G telecommunications protocols. Such techniques use registration response messages, update location requests, or update notification request messages to provide end-to-end or end-to-middle security in the provisioning process. Unlike existing over-the-air (OTA) techniques, the techniques described herein provision user privacy parameters or other similar data in a secure and verifiable manner.

18 Claims, 11 Drawing Sheets

SECURE PRIVACY PROVISIONING IN 5G NETWORKS

FIELD OF THE DISCLOSURE

The present disclosure relates to subscriber privacy and provisioning of parameters in a mobile communication network using fifth generation (5G) native protocols.

BACKGROUND

Increased subscriber privacy is one of the 5G telecommunication features that enables protection of subscriber identification. The 5G protocols offer encryption, as well as integrity protection that guards against eavesdropping. To enable the encryption and other privacy features in 5G, several parameters must be provisioned in the Universal Mobile Telecommunications Service (UMTS) subscriber identity module (USIM) application contained within the Universal Integrated Circuit Card (UICC) card that is inserted into or a permanent part of the User Equipment (UE). Parameters necessary for 5G security include the Subscriber Permanent Identifier (SUPI), Routing Indicator, Protection Scheme Identifier and the Home Network Public Key. Current methods for provisioning these parameters involve using Subscriber Identity Module (SIM) Over the Air (OTA) activation to download these parameters to the UE. The 5G specification, as published in 3GPP TS 33.501 (2018-09) Sec 5.2 continues to suggest the use of the OTA mechanism to provision the Home Network Public Key parameter and does not specify how the other necessary privacy-related parameters such as the SUPI, the routing indicator, the protection scheme identifier are provisioned in the mobile device or in the USIM module. Other telecommunication parameters that require provisioning include the proxy call state control function (P-CSCF) address, the Bootstrapping Server Function address, shared secret parameters, and other parameters that can be co-located on the UICC card in various USIM, CDMA SIM (CSIM), IP Multimedia SIM (ISIM) or SIM concurrent applications.

Unfortunately, the current OTA mechanism of provisioning these parameters is not scalable for the millions of subscribers and Internet of Things (IoT) devices that are expected to use 5G communication, and it cannot guarantee successful provisioning. In addition, the OTA mechanism is not extensible to value-added service parameters, such as login parameters or other certificates that control digital wallet, video, music or gaming services that may be used in a wireless environment. A secure and extensible method for provisioning parameters that is compatible with 5G wireless communication networks is needed.

SUMMARY

The disclosure herein generally relates to systems, methods, and non-transitory computer-readable media storing instructions that allows secure and verifiable provisioning of privacy parameters using native telecommunications protocols without using OTA methodologies. The systems, methods, and instructions disclosed herein include techniques for initial provisioning or updating privacy parameters, particularly in 5G networks. Various aspects are described in further detail below.

According to an aspect, the techniques include controlling a UE to: send a network registration request message containing an encrypted subscriber permanent identifier to a telecommunication network via a wireless data communication interface as part of a registration procedure; receive a user profile and one or more privacy parameters within an encrypted and integrity protected message from the telecommunication network via the wireless data communication interface during the registration procedure; extract and decrypt the one or more privacy parameters from the encrypted and integrity protected message; store the one or more privacy parameters in the one or more non-transitory storage media; and/or send a registration complete message to the telecommunication network via the wireless data communication interface after storing the one or more privacy parameters in the one or more non-transitory storage media. In various embodiments, the encrypted and integrity protected message may be a registration response message or a registration acceptance message.

In some embodiments, the one or more privacy parameters may include any of the SUPI type, the Home Network Identifier, the Routing Indicator, the Protection Scheme ID, and/or the Home Network Public Key. In further embodiments, the one or more privacy parameters may comprise a preferred partner list for roaming network access. The one or more privacy parameters may likewise comprise parameters necessary for provisioning value-added services comprising one or more of the following: a user phone book entry, on demand music services, on demand video services, or digital wallet services. The user profile and the one or more privacy parameters may contain updated user privacy data, such that storing the one or more privacy parameters in the one or more non-transitory storage media updates one or more previously stored privacy parameters.

According to another aspect, the techniques include a method for securing user data in mobile communication networks, comprising: receiving a network registration request message containing a subscriber permanent identifier associated with a user equipment as part of a registration procedure at one or more components of a telecommunication network; extracting the subscriber permanent identifier by the one or more components of the telecommunication network; retrieving a user profile and one or more privacy parameters based upon the subscriber permanent identifier by the one or more components of the telecommunication network; sending the user profile and the one or more privacy parameters to the user equipment by the one or more components of the telecommunication network, wherein the user equipment receives the user profile and the one or more privacy parameters in an encrypted and integrity protected message during the registration procedure; and/or receiving a registration complete message from the user equipment by the one or more components of the telecommunication network. The one or more components of the telecommunication network may comprise one or more of a Unified Data Management component or an Authentication Server Function.

In some embodiments, the network registration request message may contain the subscriber permanent identifier in an encrypted form as an encrypted subscriber permanent identifier, such that extracting the subscriber permanent identifier includes decrypting the encrypted subscriber permanent identifier. In such embodiments, sending the user profile and the one or more privacy parameters to the user equipment may comprise generating the encrypted and integrity protected message by the one or more components of the telecommunication network. In some such embodiments, the telecommunication network may be a home network, and receiving the network registration request message may comprise receiving the network registration request message from a serving network. Thus, sending the user profile and the one or more privacy parameters to the user equipment may likewise comprise sending the encrypted and integrity protected message to the serving network in order to cause the serving network to communicate the encrypted and integrity protected message to the user equipment, and receiving the registration complete message from the user equipment may include receiving the registration complete message from the serving network in response to the user equipment communicating the registration complete message to the serving network.

In further embodiments, the telecommunication network may be a home network, and receiving the network registration request message may include receiving the network registration request message containing the subscriber permanent identifier in an unencrypted form from a serving network. Thus, sending the user profile and the one or more privacy parameters to the user equipment may include sending the user profile and the one or more privacy parameters to the serving network in an unencrypted and unprotected form in order to cause the serving network to: (i) generate the encrypted and integrity protected message including the user profile and the one or more privacy parameters and (ii) communicate the encrypted and integrity protected message to the user equipment, and receiving the registration complete message from the user equipment may include receiving the registration complete message from the serving network in response to the user equipment communicating the registration complete message to the serving network.

In various embodiments, the encrypted and integrity protected message may be a registration response message or a registration acceptance message. In some embodiments, the one or more privacy parameters may include any of the SUPI type, the Home Network Identifier, the Routing Indicator, the Protection Scheme ID, and/or the Home Network Public Key. In further embodiments, the one or more privacy parameters may comprise a preferred partner list for roaming network access. The one or more privacy parameters may likewise comprise parameters necessary for provisioning value-added services comprising one or more of the following: a user phone book entry, on demand music services, on demand video services, or digital wallet services. The user profile and the one or more privacy parameters may contain updated user privacy data.

According to another aspect, the techniques include a method for securing user data in mobile communication networks, comprising: registering a user equipment by a registration procedure using a subscriber permanent identifier associated with the user equipment by one or more components of a telecommunication network; determining an update to one or more privacy parameters associated with the subscriber permanent identifier is available after completion of the registration procedure by the one or more components of the telecommunication network; retrieving an updated user profile and one or more updated privacy parameters based upon the subscriber permanent identifier by the component of the telecommunication network; sending the updated user profile and the one or more updated privacy parameters to the user equipment by the component of the telecommunication network, wherein the user equipment receives the updated user profile and the updated one or more privacy parameters in an encrypted and integrity protected message; and/or receiving an update confirmation from the user equipment by the component of the telecommunication network. The one or more components of the telecommunication network may comprise one or more of a Unified Data Management component or an Authentication Server Function.

The encrypted and integrity protected message may be an update notification request message, and receiving the update confirmation may comprise receiving an update notification response message. In various embodiments, the one or more privacy parameters may include any of the SUPI type, the Home Network Identifier, the Routing Indicator, the Protection Scheme ID, and/or the Home Network Public Key. In further embodiments, the one or more privacy parameters may comprise a preferred partner list for roaming network access. The one or more privacy parameters may likewise comprise parameters necessary for provisioning value-added services comprising one or more of the following: a user phone book entry, on demand music services, on demand video services, or digital wallet services.

In some embodiments, sending the updated user profile and the one or more updated privacy parameters to the user equipment may comprise generating the encrypted and integrity protected message by the one or more components of the telecommunication network. In some such embodiments, the telecommunication network may be a home network, and sending the updated user profile and the one or more updated privacy parameters to the user equipment may comprise sending the encrypted and integrity protected message to a serving network in order to cause the serving network to communicate the encrypted and integrity protected message to the user equipment. Thus, receiving the update confirmation may comprise receiving an update notification response message from the serving network in response to the user equipment communicating the update notification response message to the serving network. The update notification response message may be encrypted and integrity protected.

In further embodiments, the telecommunication network may be a home network, and sending the updated user profile and the one or more updated privacy parameters to the user equipment may comprise sending the updated user profile and the one or more updated privacy parameters to a serving network in an unencrypted and unprotected form in order to cause the serving network to: (i) generate the encrypted and integrity protected message including the updated user profile and the one or more updated privacy parameters and (ii) communicate the encrypted and integrity protected message to the user equipment. Thus, receiving the update confirmation may comprise receiving an unencrypted and unprotected update notification response message from the serving network in response to the user equipment communicating an encrypted and integrity protected update notification response message to the serving network.

BRIEF DESCRIPTION OF THE DRAWINGS

The figures described below depict various aspects of the systems and methods disclosed herein. Advantages will become more apparent to those skilled in the art from the following description of the embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive. Further, wherever possible, the following description refers to the reference numerals included in the following figures, in which features depicted in multiple figures are designated with consistent reference numerals.

DETAILED DESCRIPTION

Figure 1:
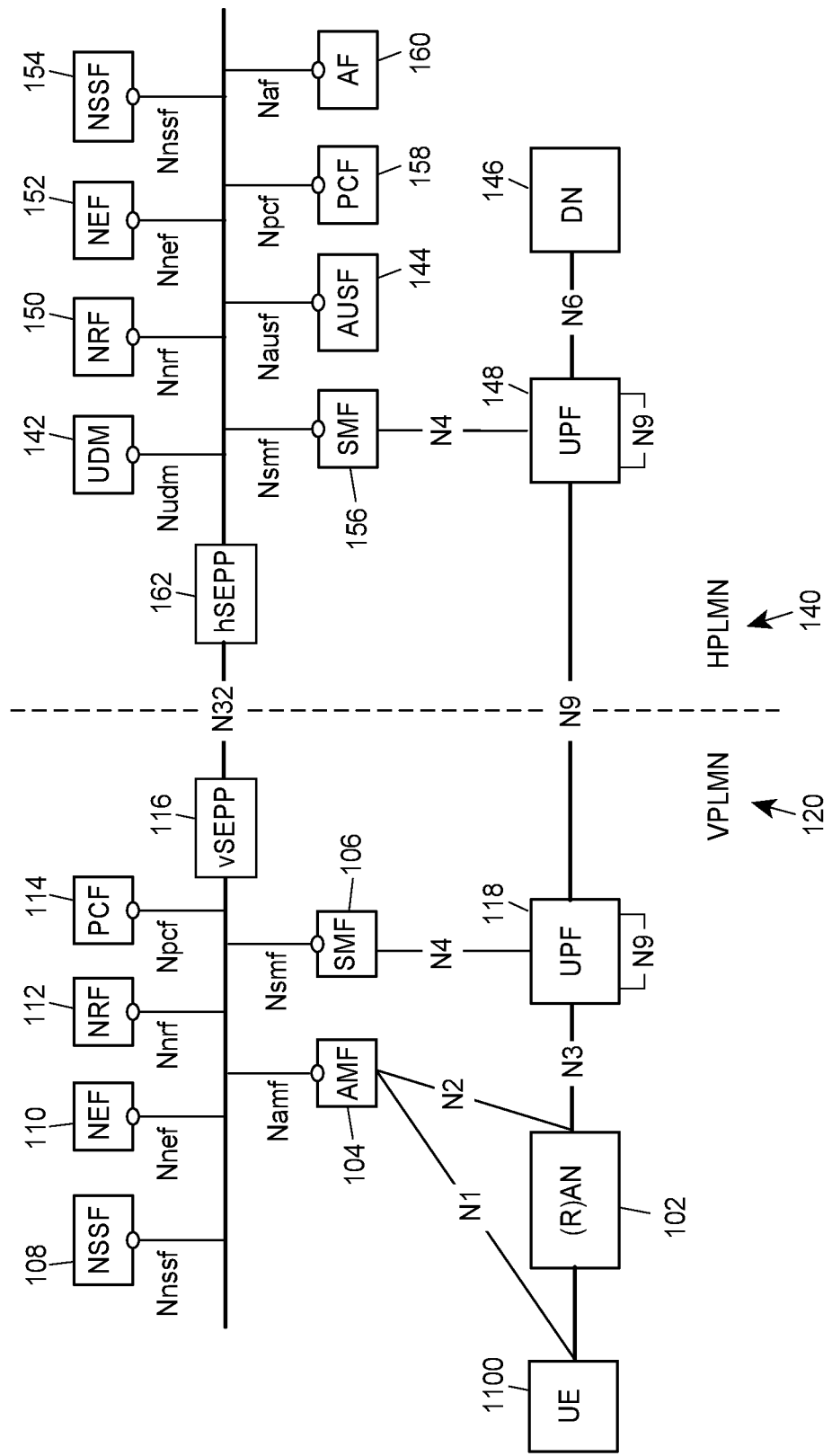
FIG. 1 illustrates a block diagram of an exemplary 3GPP roaming architecture for a 5G mobile communications network on which the secure provisioning of parameters may be implemented according to the techniques disclosed herein.

The techniques disclosed herein relate to systems, methods, and instructions stored on computer-readable media for the protection and the provisioning of privacy data and other parameters of mobile network operators and mobile network users. Unlike existing over-the-air (OTA) techniques, the techniques described herein provision user profiles, parameters, or other similar data in a secure and verifiable manner. Various embodiments provide for end-to-end protection between a home network and User Equipment (UE), while other embodiments provide for end-to-middle protection between the UE and a serving network. The techniques disclosed herein involve securely provisioning privacy parameters and other user privacy data in a mobile communications network using existing (5G) telecommunication messaging. The user privacy data may include privacy parameters necessary for network security, such as the subscriber permanent identifier (SUPI), the routing indicator, the protection scheme identifier, and the home network key. The user privacy data may also include parameters specific to delivering user services, such as a list of preferred network partners (e.g., a Preferred Roaming List), a list of pre-populated phone numbers for a customer mobile address book (e.g., an emergency phone number, a voicemail number, or a phone number for the operator's technical support), a preferred Short Message Service Center (SMSC number) or P-CSCF identifier, or parameters for non-telecommunication applications (e.g., payment credentials used for digital wallet services or identifiers needed for music, video, or other value-added services that require initial secure parameters for a secure log-on process). In some embodiments, the user privacy data may include a user profile or portions thereof.

In order to offer the maximum protection to the additional privacy parameters, the techniques disclosed herein use private and public key encryption, as well as integrity protection offered by 5G telecommunications protocols. Existing standards, such as the current 3GPP 5G standards for mobile telecommunications (e.g., 3GPP TS 33.501 2018-09 Sec 5.2), continue to suggest the use of an OTA mechanism to provision the Home Network Public Key parameter. Many operators not only use the OTA method for the Home Network Public Key but also use OTA methods for other necessary privacy-related parameters that are provisioned for 5G security and privacy purposes, such as the SUPI, the routing indicator, and the protection scheme identifier. OTA methods are also currently used by carriers, with limited success, to provision "Preferred Partner" lists (also called "preferred roaming lists" or PRLs), as well as to pre-provision subscriber phone books with phone numbers for emergency and technical support. Carriers may also need to provision or update other information in UE's such as the preferred short message service center (SMSC number) address used for short messaging, the proxy call state control function (P-CSCF) address used for IMS messaging, the service provider name, the authentication key (Ki), temporary location information (LAI), position security information (e.g., TMSI) service dialing numbers (SDN), and advice of charge parameters (AoC). Many telecommunication carriers now also offer additional value-added services, such as video or music services, which may require additional logon parameters.

The 5G protocol specifies that the SUPI should not be sent over the air without being encrypted. The SUPI is encrypted using elliptical curve encryption methods to create a concealed SUPI (also called a scheme output), which is contained in a Subscriber Concealed Identifier (SUCI). The concealment can be done in the USIM or Mobile Equipment (ME), depending on the configuration of the USIM by the operator. In addition to the concealed SUPI, the SUCI may contain or be generated using the following parameters: the SUPI type, the Home Network Identifier, the Routing Indicator, the Protection Scheme ID, and the Home Network Public Key. The systems, methods and mediums described in this innovation relate to use of 5G native protocols, rather than over-the-air activation to provision these and other user privacy parameters in a secure and reliable manner.

It is noted that the authentication procedure in 3GPP 5G supports the extensible authentication protocol (EAP), which can contain optional parameters. The EAP also allows the use of different types of credentials besides the ones commonly used in mobile networks and typically stored in the USIM, including certificates and username/password combinations. For scenarios where the parameters are stored in the ME of the UE, the EAP may be used to enable the added privacy parameters for value-added services according to the various techniques disclosed herein by provisioning such added privacy parameters using any of the techniques described below.

FIG. 1 illustrates a block diagram of an exemplary 3GPP roaming architecture for a 5G mobile communications network on which the secure provisioning of parameters may be implemented according to the techniques disclosed herein. The exemplary roaming architecture shows a serving network (the Visiting Public Land Mobile Network or VPLMN) 120 on left side attached via connection N32 and N9 to a home network (the Home Public Land Mobile Network or HPLMN) 140 on the right. In this configuration, the UE 1100 is attached to the serving network 120 (VPLMN) by connection N32. The UE 1100 is connected wirelessly to the Radio Access Network (RAN) 102. The UE 1100 is also shown attached via logical connection N1 to the AMF 104. The RAN 102 may include a gNodeB (not shown), which is connected via connection N2 to the AMF 104. Within the serving network 120 (VPLMN), FIG. 1 also illustrates other 5G elements, including the Session Management Function 106 (SMF), the Network Slice Selection Function (NSSF) 108, the Network Exposure Function (NEF) 110, the Network Function Repository Function (NRF) 112, the Policy Control Function (PCF) 114, the visiting Security Edge Protection Proxy (vSEPP) 116, and the User Plane Function (UPF) 118.

FIG. 1 also illustrates the home network 140 (HPLMN), which, in the roaming use cases, is a controlled by a different wireless carrier than the serving network 120 (VPLMN). The home network 140 (HPLMN) includes a Unified Data Management component (UDM) 142, as well as the Authentication Server Function (AUSF) 144. Either the AUSF or UDM could be used by carriers to implement secure provisioning by the home network 140, while the AMF 104 is used for provisioning by the serving network 120 in the roaming use cases. Within the home network 140, FIG. 1 also illustrates other 5G elements including the Network Function Repository Function (NRF) 150, the Network Exposure Function (NEF) 152, the Network Slice Selection Function (NSSF) 154, the Application Functions (AF) 160, the Policy Control Function (PCF) 158, the Session Management Function (SMF) 156, the Data Network (DN) 146, the User Plane Function (UPF) 148, and the home Security Edge Protection Proxy (hSEPP) 162.

Figure 2:
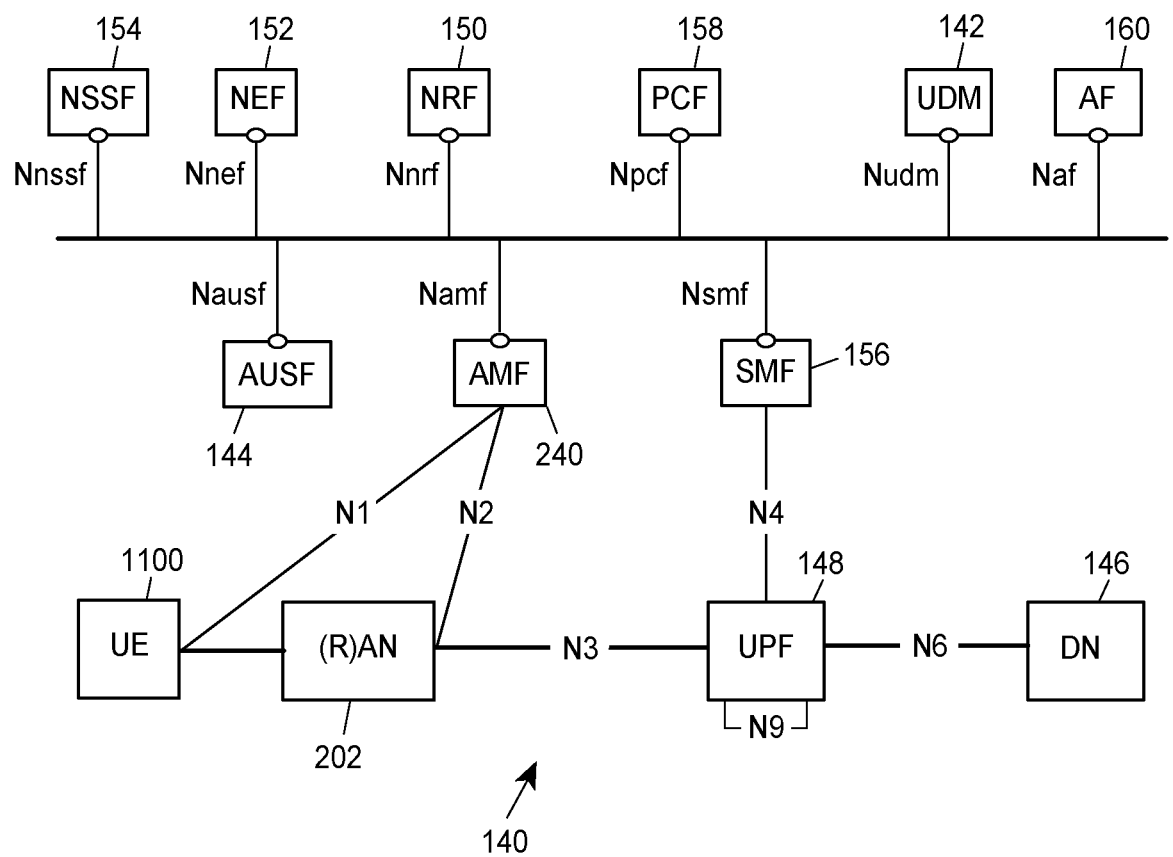
FIG. 2 illustrates a block diagram of an exemplary 3GPP non-roaming architecture, in which the User Equipment (UE) connects completely within the home network of its home carrier.

FIG. 2 illustrates a block diagram of an exemplary 3GPP non-roaming architecture, in which the UE 1100 connects completely within the home network 140 of its home carrier. The UE 1100 is wireless connected to the Radio Access Network (RAN) 202 of the home carrier and logically connected to the AMP 240 of the home carrier. Because the UE 1100 is directly connected to the home network 140, the RAN 202 and AMP 240 are illustrated for the first time in FIG. 2, which are distinct from corresponding elements 102 and 104 of the serving network 140. In the configuration illustrated in FIG. 2, either the UDM 142 or the AUSF 144 can be used by the home carrier to implement secure provisioning. FIG. 2 also illustrates the other elements in the home network 140, as previously shown in FIG. 1: the NSSF 154, the NEF 152, the NRF 150, the PCF 158, the AF 160, the SMF 156, the DN 146, and the UPF 148.

Figure 3:
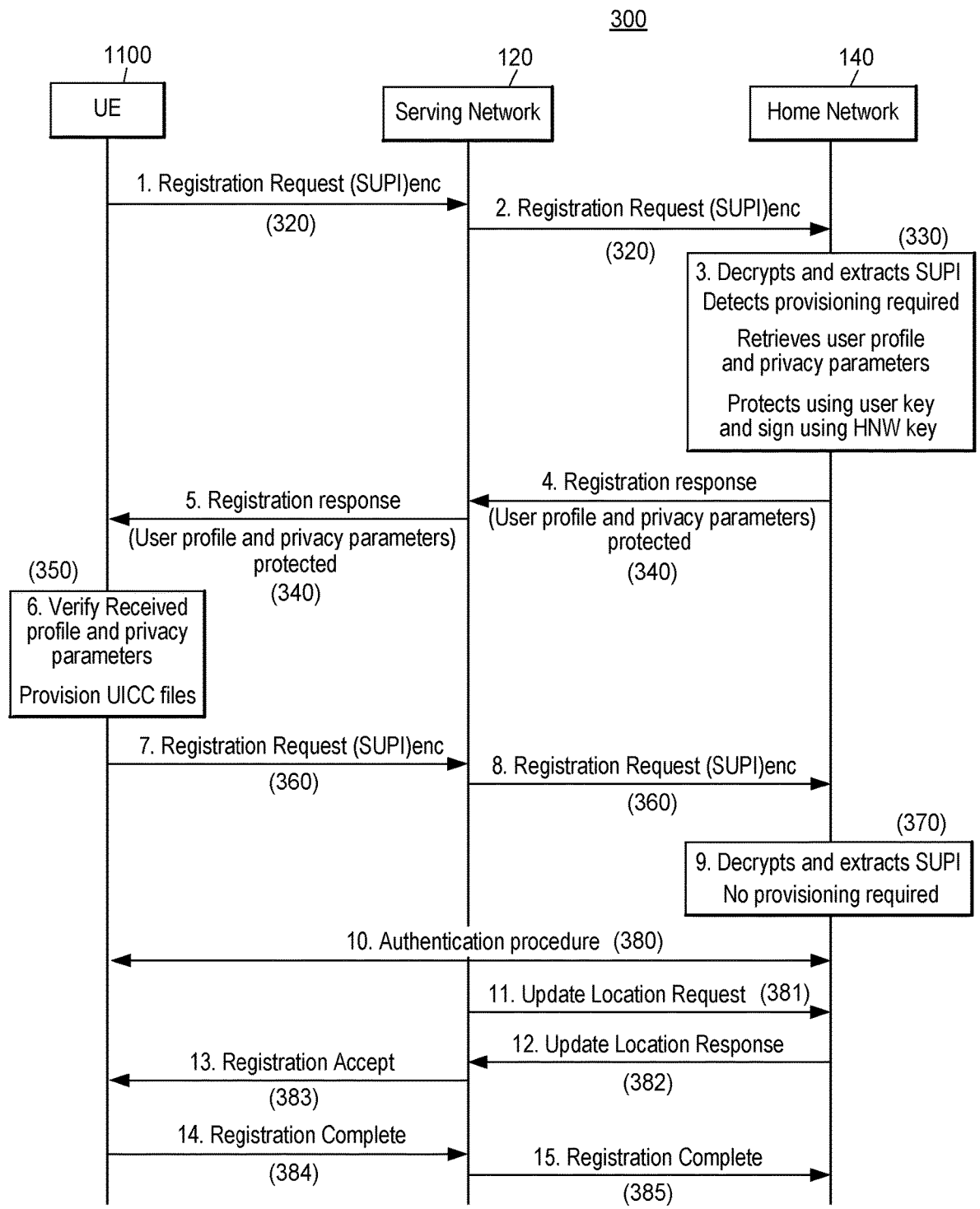
FIG. 3 illustrates a sequence diagram of an initial registration process for registering the UE by the home network using registration response messages, with end-to-end security.

FIG. 3 illustrates a sequence diagram of an initial registration process 300 for registering the UE 1100 by the home network 140 with end-to-end security. In such embodiment, the home network 140 handles encryption and decryption, as well as generating a 3GPP registration response message 340 to deliver privacy parameters to the UE 1100. The registration response message 340 contains the provisioned parameters in an encrypted message, such that the serving network 120 cannot obtain the message content. Such end-to-end encryption protects the parameters from interception by third parties, including third parties with access to network traffic on the serving network 120.

The initial registration process 300 begins with the UE 1100 sending a registration request message 320 to the home network 140. When the UE 1100 is connected to the home network 140 through a serving network 120 (as illustrated in FIG. 3), the UE 1100 sends the registration request message 320 to the serving network 120, which then passes the registration request message 320 to the home network 140. The registration request message 320 includes a SUPI to identify an account associated with the UE 1100, which is encrypted at the UE 1100 to provide end-to-end security between the UE 1100 and the home network 140. Upon receiving the registration request message 320, the home network 140 extracts and decrypts the SUPI from the registration request message 320 and determines that provisioning of user privacy data is required (block 330). The home network 140 retrieves the corresponding user privacy data (i.e., the user profile and privacy parameters) based upon the SUPI and protects the user privacy data for secure provisioning to the UE 1100. Encryption, decryption, and retrieval of the user privacy data may be managed in the home network 140 by either the AUSF 144 or UDM 142 elements. The home network 140 then generates and sends the registration response message 340 to the UE 1100 via the serving network 120. The registration response message 340 is passed to the serving network 120, which passes on the contents to the UE 1100 in a further registration response message 340. Upon receiving the registration response message 340, the UE 1100 decrypts the profile and the privacy parameters from the registration response message 340 (block 350). The UE 1100 may then store the received user profile and privacy parameters for further use, which may include provisioning the files to the UICC for use in accessing network functionalities.

After initial provisioning of the user privacy data, the UE 1100 may send a second registration request message 360 to the home network 140 via the serving network 120. Like the registration request message 320, the second registration request message 360 includes the SUPI in an encrypted state to ensure end-to-end security. Upon receiving the second registration request message 360 and extracting and decrypting the SUPI, the home network 140 determines that no additional provisioning is required (block 370). Therefore, no additional registration response with updated parameters is required, and registration continues according to known processes with an authentication procedure 380 between the UE 1100 and the home network 140, followed by an update location request 381 from the serving network 120 to the home network 140 and an update location response 382 from the home network 140 to the serving network 120. The serving network 120 then sends a registration acceptance message 383 to the UE 1100, and the UE 1100 sends a registration complete message 384 back to the serving network 120, which sends a corresponding registration complete message 385 to the home network 140 to end the initial registration process 300.

Figure 4:
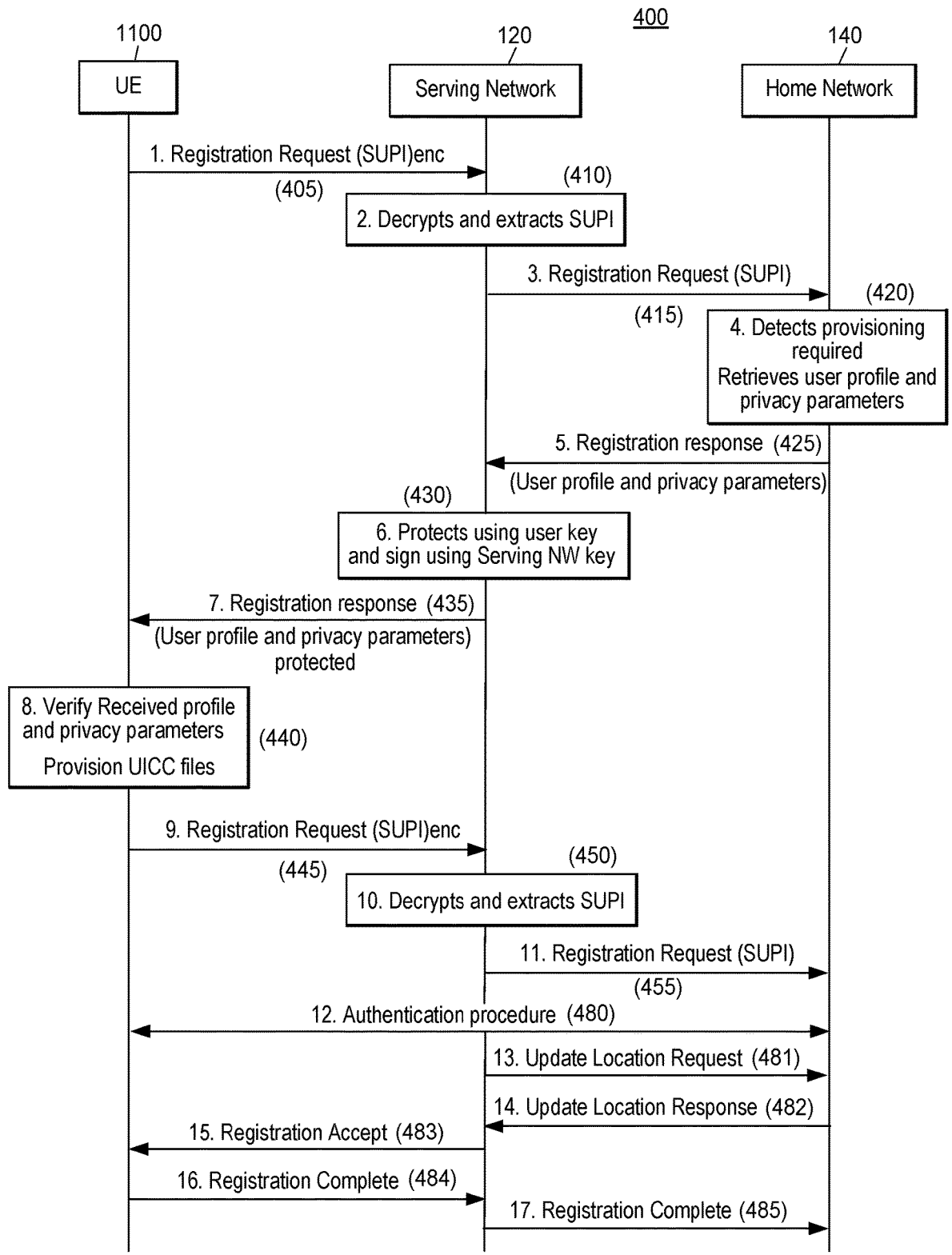
FIG. 4 illustrates a sequence diagram of an initial registration process for registering the UE by the serving network using registration response messages, with end-to-middle security.

FIG. 4 illustrates a sequence diagram of an initial registration process 400 for registering the UE 1100 by the serving network 120 with end-to-middle security. In contrast to the initial registration process 300 described above, the initial registration process 400 provides for encryption and decryption by the serving network 120, rather than the home network 140. Thus, the user privacy data is protected between the UE 1100 and the serving network 120, but the serving network 120 and home network 140 communicate over communication channels that are otherwise secured between the VPLMN and the HPLMN. This may advantageously reduce the data communicated between the networks where the serving network 120 is a trusted network.

The initial registration process 400 begins with the UE 1100 sending a secure registration request message 405 to the serving network 120. The secure registration request message 405 includes a SUPI to identify an account associated with the UE 1100, which is encrypted to provide end-to-middle security between the UE 1100 and the serving network 120. Upon receiving the secure registration request message 405, the serving network 120 decrypts and extracts the SUPI (block 410), which may be performed using a cryptographic key received from the home network 140. The serving network 120 then sends the unencrypted SUPI to the home network 140 in a registration request message 415. Upon receiving the registration request message 415 from the serving network 120, the home network 140 determines whether provisioning of user privacy data is required and, when required, retrieves user privacy data based upon the SUPI (block 420). The user privacy data is then sent to the serving network 120 in a registration response message 425. The serving network 120 then protects the user privacy data (block 430) and sends the protected user privacy data to the UE 1100 in a secure registration response message 435. Upon receiving the secure registration response message 435, the UE 1100 decrypts the profile and the privacy parameters from the secure registration response message 435 (block 440). The UE 1100 may then store the received user profile and privacy parameters for further use, which may include provisioning the files to the UICC for use in accessing network functionalities.

After initial provisioning of the user privacy data, the UE 1100 may send a second secure registration request message 445 to the serving network 120, which again includes the SUPI in an encrypted message. As previously, the serving network 120 decrypts and extracts the SUPI from the second secure registration request message 445 (block 450), then sends the extracted SUPI to the home network 140 in a second registration request message 455. Since no additional provisioning is required, registration continues according to known processes with an authentication procedure 480 between the UE 1100 and the home network 140, followed by an update location request 481 from the serving network 120 to the home network 140 and an update location response 482 from the home network 140 to the serving network 120. The serving network 120 then sends a registration acceptance message 483 to the UE 1100, and the UE 1100 sends a registration complete message 484 back to the serving network 120, which sends a corresponding registration complete message 485 to the home network 140 to end the initial registration process 400.

Figure 5:
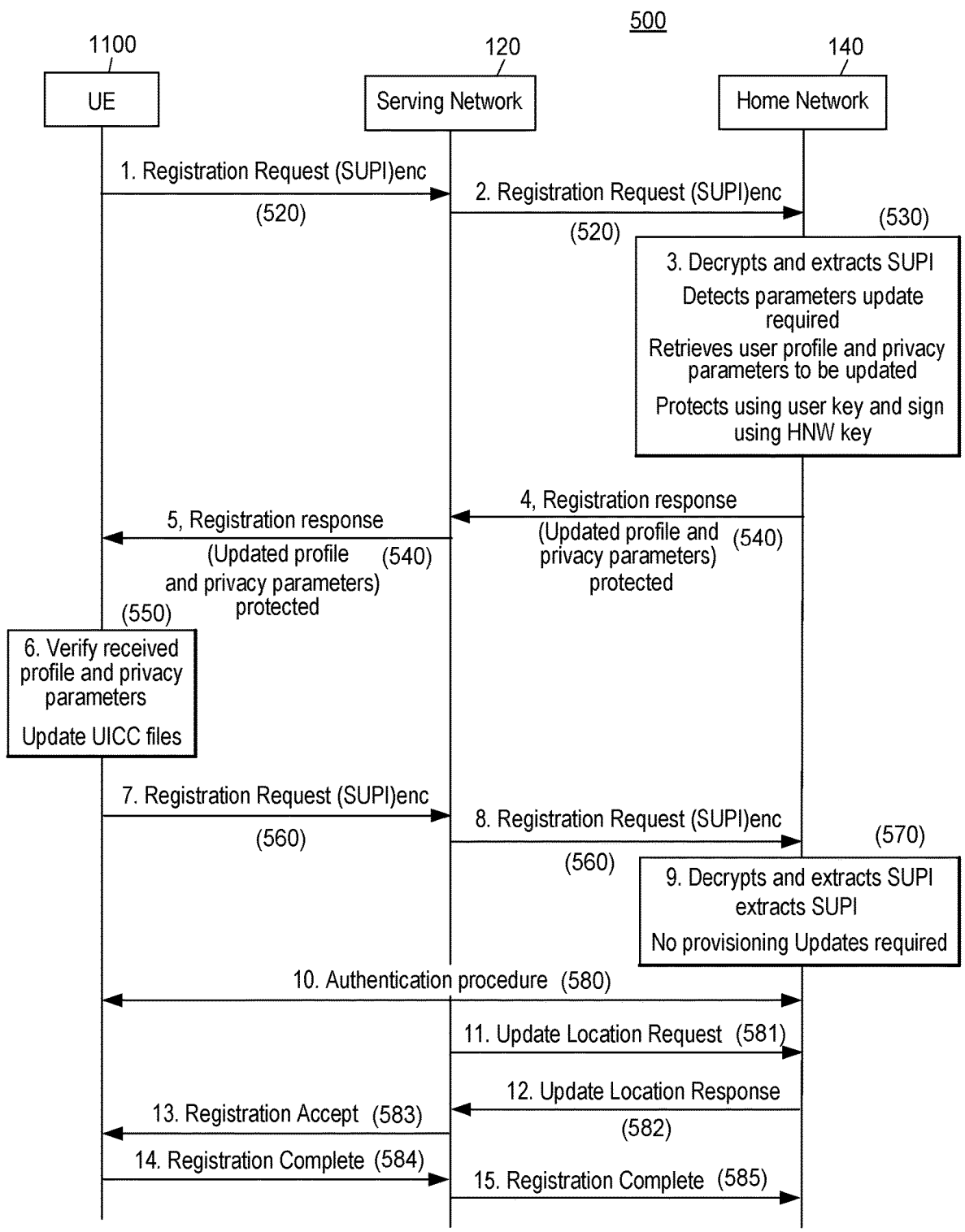
FIG. 5 illustrates a sequence diagram of an update process for updating user privacy parameters by the home network using registration response messages, with end-to-end security.

FIG. 5 illustrates a sequence diagram of an update process 500 for updating user privacy parameters by the home network 140 with end-to-end security. The update process 500 is similar to the initial registration process 300, but the update process 500 updates user privacy parameters within the UE 1100 after initial provisioning. Unlike existing OTA updating techniques, the update process 500 is both secure and verifiable.

The update process 500 begins with the UE 1100 sending a registration request message 520 including an encrypted SUPI to the home network 140 via the serving network 120. Upon receiving the registration request message 520, the home network 140 extracts and decrypts the SUPI from the registration request message 520, determines that a provisioning update is required, retrieves the corresponding updated user privacy data (e.g., updated user profile or privacy parameters) based upon the SUPI, and protects the updated user privacy data for secure provisioning to the UE 1100 (block 530). The home network 140 then sends the updated user privacy data to the UE 1100 via the serving network 120 in a registration response message 540 that is protected end-to-end. Upon receiving the registration response message 540, the UE 1100 decrypts the updated user privacy data from the registration response message 540 and updates the user privacy data on the UICC (block 550). The UE 1100 may update previously stored user profile and privacy parameters with the updated user privacy data for further use, which may include provisioning the files to the UICC for use in accessing network functionalities.

After provisioning the updated user privacy data, the UE 1100 may send a second registration request message 560 to the home network 140 via the serving network 120. Like the registration request message 520, the second registration request message 560 includes the SUPI in an encrypted state to ensure end-to-end security. Upon receiving the second registration request message 560 and extracting and decrypting the SUPI, the home network 140 determines that no additional updates are available for provisioning (block 570). The update process 500 continues with an authentication procedure 580 between the UE 1100 and the home network 140, followed by an update location request 581 from the serving network 120 to the home network 140 and an update location response 582 from the home network 140 to the serving network 120. The serving network 120 then sends a registration acceptance message 583 to the UE 1100, and the UE 1100 sends a registration complete message 584 back to the serving network 120, which sends a corresponding registration complete message 585 to the home network 140 to end the update process 500.

Figure 6:
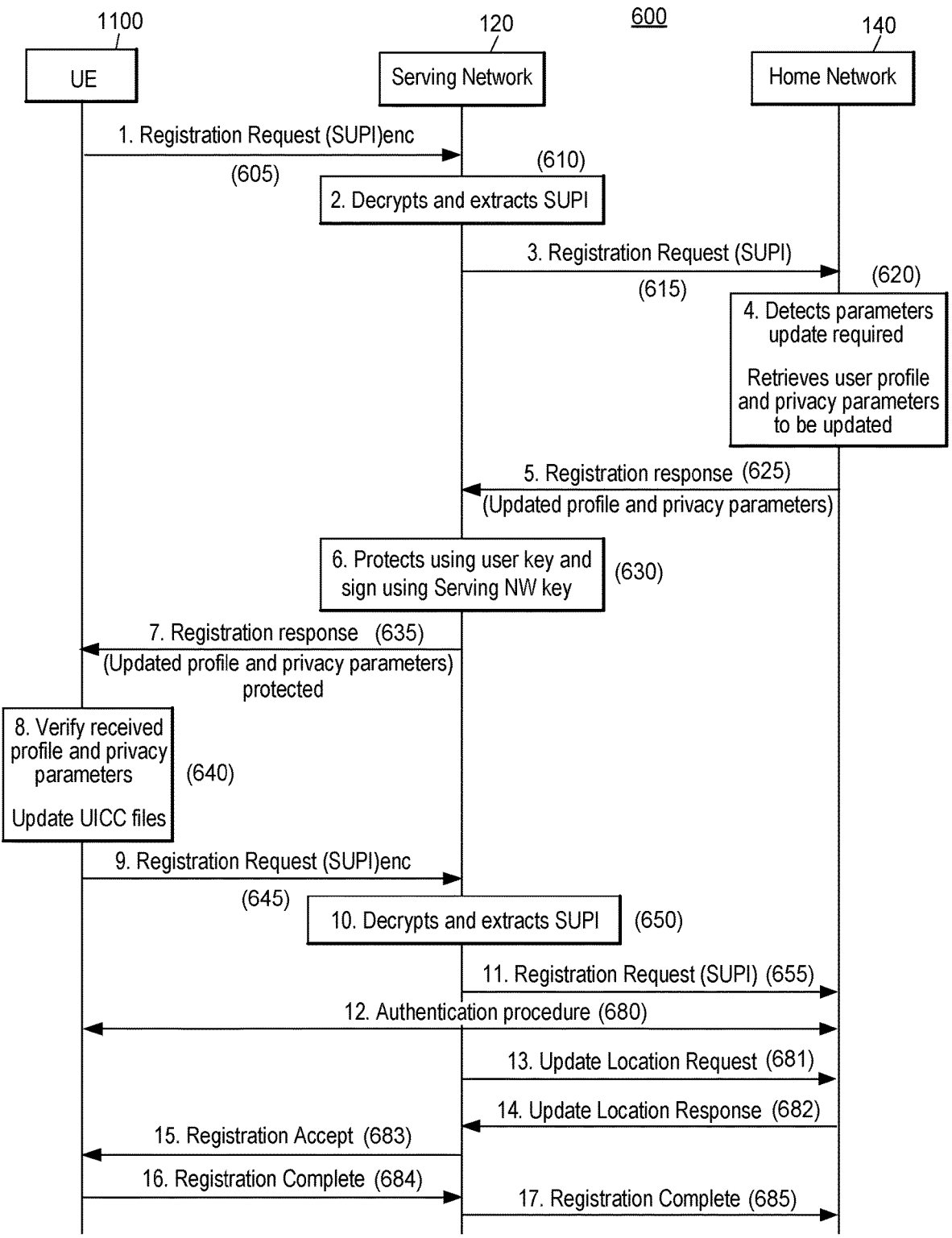
FIG. 6 illustrates a sequence diagram of an update process for updating user privacy parameters by the serving network using registration response messages, with end-to-middle security.

FIG. 6 illustrates a sequence diagram of an update process 600 for updating user privacy parameters by the serving network 140 with end-to-middle security. The update process 600 is similar to the initial registration process 400, but the update process 600 updates user privacy parameters within the UE 1100 after initial provisioning. Unlike existing OTA updating techniques, the update process 600 is both secure and verifiable.

The update process 600 begins with the UE 1100 sending a secure registration request message 605 to the serving network 120, which includes a SUPI encrypted to provide end-to-middle security between the UE 1100 and the serving network 120. Upon receiving the secure registration request message 605, the serving network 120 decrypts and extracts the SUPI (block 610), then sends the unencrypted SUPI to the home network 140 in a registration request message 615. Upon receiving the registration request message 615, the home network 140 determines whether updates are available to the user privacy data for provisioning and, when available, retrieves updated user privacy data based upon the SUPI (block 620). The updated user privacy data is then sent to the serving network 120 in a registration response message 625. The serving network 120 then protects the updated user privacy data (block 630) and sends the protected updated privacy data to the UE 1100 in a secure registration response message 635. Upon receiving the secure registration response message 635, the UE 1100 decrypts the updated user privacy data from the registration response message 540 and updates the user privacy data on the UICC (block 640). The UE 1100 may update previously stored user profile and privacy parameters with the updated user privacy data for further use, which may include provisioning the files to the UICC for use in accessing network functionalities.

After initial provisioning of the user privacy data, the UE 1100 may send a second secure registration request message 645 to the serving network 120, which again includes the SUPI in an encrypted message. As previously, the serving network 120 decrypts and extracts the SUPI from the second secure registration request message 645 (block 650), then sends the extracted SUPI to the home network 140 in a second registration request message 655. Since no additional updates are available for provisioning, the update process 600 continues with an authentication procedure 680 between the UE 1100 and the home network 140, followed by an update location request 681 from the serving network 120 to the home network 140 and an update location response 682 from the home network 140 to the serving network 120. The serving network 120 then sends a registration acceptance message 683 to the UE 1100, and the UE 1100 sends a registration complete message 684 back to the serving network 120, which sends a corresponding registration complete message 685 to the home network 140 to end the update process 600.

Figure 7:
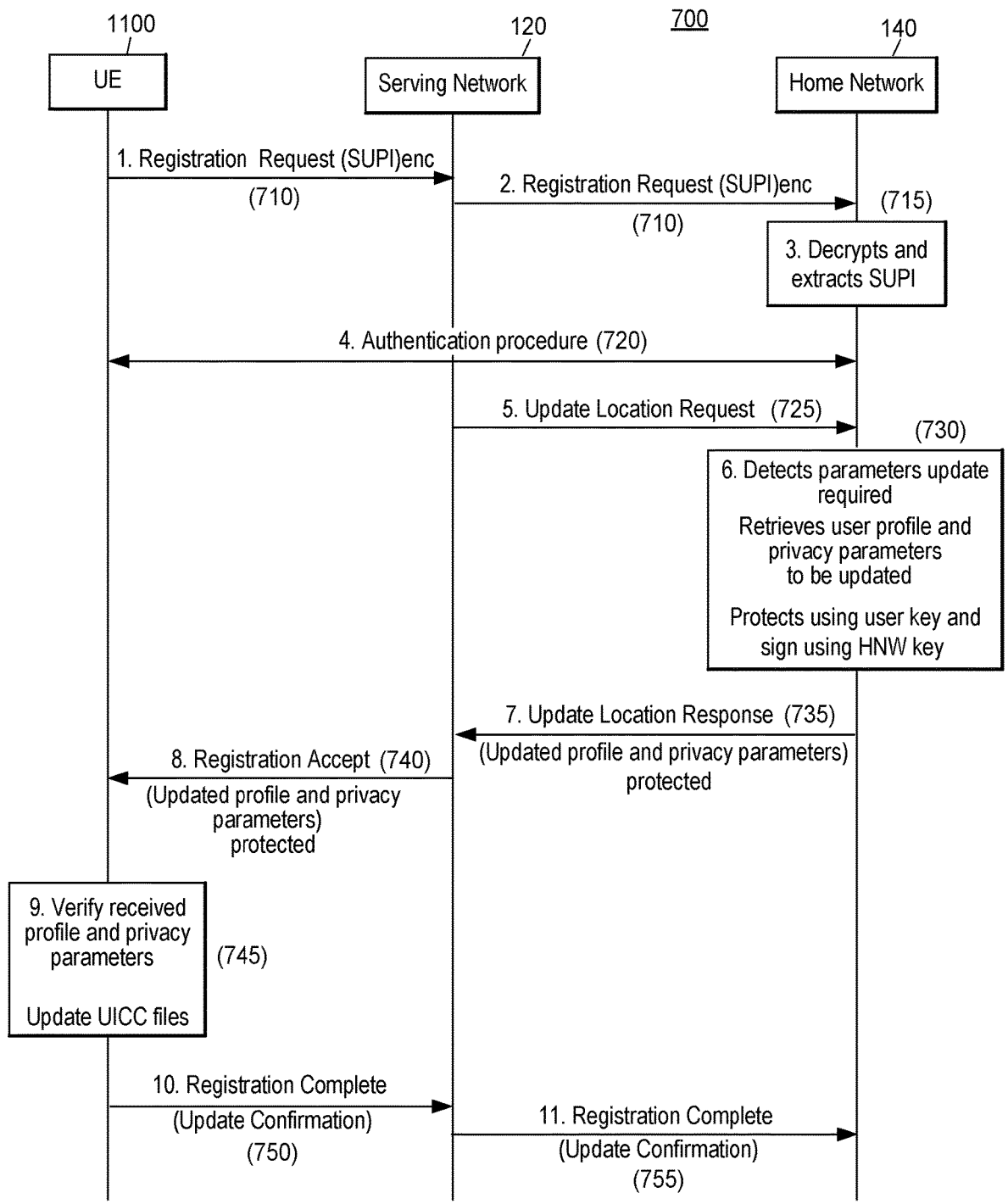
FIG. 7 illustrates a sequence diagram of a provisioning process for providing user privacy parameters after authentication using an update location request, with end-to-end security.

FIG. 7 illustrates a sequence diagram of a provisioning process 700 for providing user privacy parameters after authentication using an update location request, with end-to-end security. Such process provides an alternative to the above-described techniques that also enables secure and verifiable provisioning of user privacy data. Although described with reference to updating user privacy data, the process may be used for initial provisioning or updating user profiles, privacy parameters, or other data. Rather than sending the user privacy data in a registration response message, the provisioning process 700 involves sending the user privacy data to the UE 1100 in response to an update location request 725.

The provisioning process 700 begins with the UE 1100 sending a registration request message 710 to the home network 140. When the UE 1100 is connected to the home network 140 through a serving network 120 (as illustrated in FIG. 7), the UE 1100 sends the registration request message 710 to the serving network 120, which then passes the registration request message 710 to the home network 140. The registration request message 710 includes a SUPI to identify an account associated with the UE 1100, which is encrypted at the UE 1100 to provide end-to-end security between the UE 1100 and the home network 140. Upon receiving the registration request message 710, the home network 140 extracts and decrypts the SUPI from the registration request message 710. Registration continues according to known processes with an authentication procedure 720 between the UE 1100 and the home network 140.

Following authentication, the serving network 120 sends an update location request 725 to the home network 140. In response to receiving the update location request 725, the home network 140 determines that provisioning of user privacy data is required, then retrieves the corresponding user privacy data to be provisioned (e.g., a user profile and privacy parameters) based upon the SUPI previously received from the UE 1100 and protects the user privacy data for secure provisioning to the UE 1100 (block 730). Encryption, decryption, and retrieval of the user privacy data may be managed in the home network 140 by either the AUSF 144 or UDM 142 elements. The home network 140 then generates and sends an update location response message 735 containing the protected user privacy data to the serving network 120. The serving network 120 passes this protected user privacy data to the UE 1100 in a registration acceptance message 740, without the serving network 120 being able to access the user privacy data in the message. Upon receiving the registration acceptance message 740, the UE 1100 decrypts the profile and the privacy parameters from the protected user privacy data (block 745). The UE 1100 may then store the received user profile and privacy parameters for further use, which may include provisioning the files to the UICC for use in accessing network functionalities. The UE 1100 then sends a registration complete message 750 back to the serving network 120, which sends a corresponding registration complete message 755 to the home network 140 to end the provisioning process 700.

Figure 8:
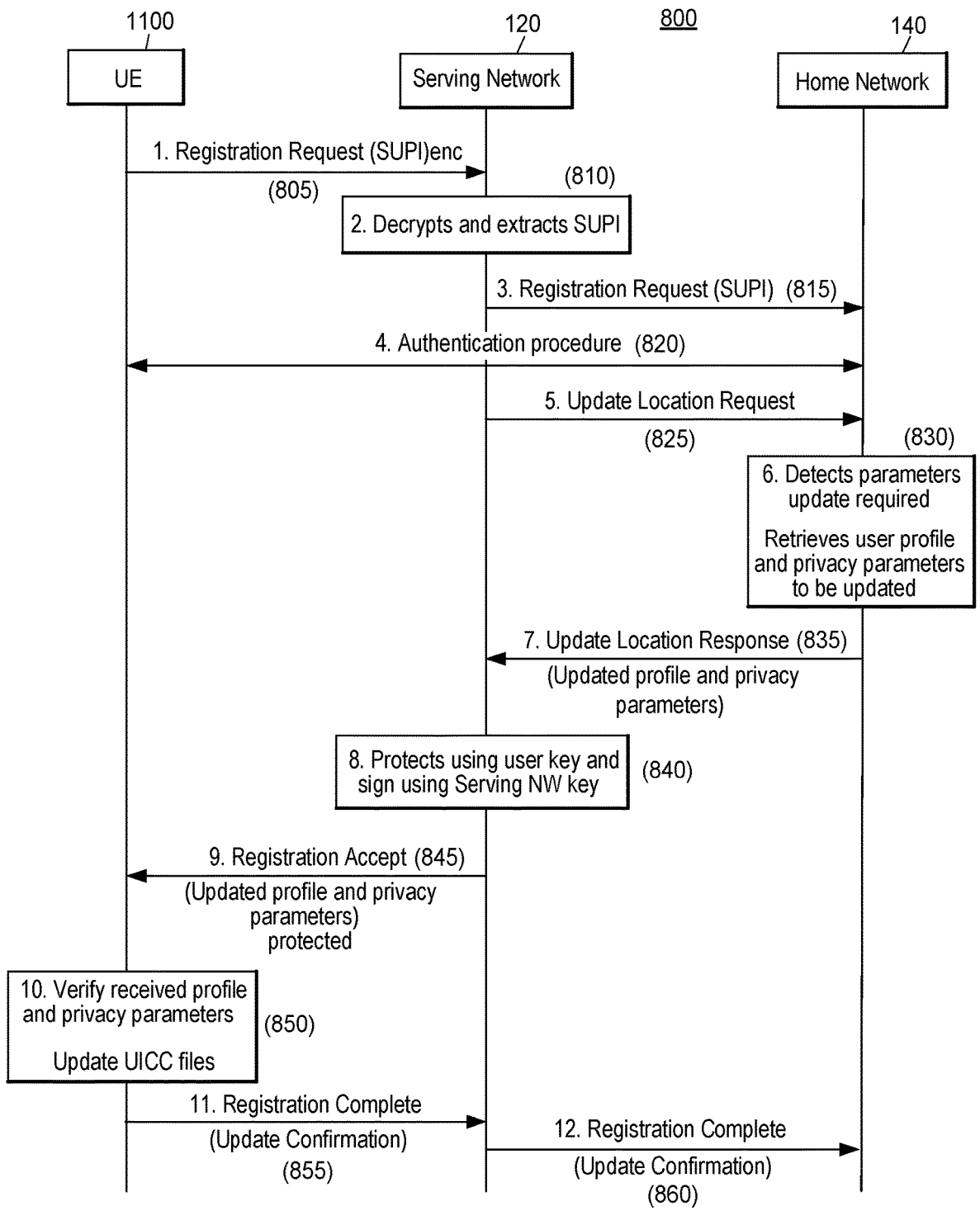
FIG. 8 illustrates a sequence diagram of a provisioning process for providing user privacy parameters after authentication using an update location request, with end-to-middle security.

FIG. 8 illustrates a sequence diagram of a provisioning process 800 for providing user privacy parameters after authentication using an update location request, with end-to-middle security. In contrast to the provisioning process 700 described above, the provisioning process 800 provides for encryption and decryption by the serving network 120, rather than the home network 140. Thus, the user privacy data is protected between the UE 1100 and the serving network 120, but the serving network 120 and home network 140 communicate over communication channels that are otherwise secured between the VPLMN and the HPLMN. This may advantageously reduce the data communicated between the networks where the serving network 120 is a trusted network.

The provisioning process 800 begins with the UE 1100 sending a secure registration request message 805 to the serving network 120. The secure registration request message 805 includes a SUPI to identify an account associated with the UE 1100, which is encrypted to provide end-to-middle security between the UE 1100 and the serving network 120. Upon receiving the secure registration request message 805, the serving network 120 decrypts and extracts the SUPI (block 810), which may be performed using a cryptographic key received from the home network 140. The serving network 120 then sends the unencrypted SUPI to the home network 140 in a registration request message 815. Registration continues according to known processes with an authentication procedure 820 between the UE 1100 and the home network 140.

Following authentication, the serving network 120 sends an update location request 825 to the home network 140. In response to receiving the update location request 825, the home network 140 determines that provisioning of user privacy data is required, then retrieves the corresponding user privacy data to be provisioned (e.g., a user profile and privacy parameters) based upon the SUPI previously received from the UE 1100 (block 830). The home network 140 then generates and sends an update location response message 835 containing the user privacy data to the serving network 120. The serving network 120 then protects the user privacy data (block 840) and sends the protected user privacy data to the UE 1100 in a registration acceptance message 845. Upon receiving the registration acceptance message 845, the UE 1100 decrypts the profile and the privacy parameters from the protected user privacy data (block 850). The UE 1100 may then store the received user profile and privacy parameters for further use, which may include provisioning the files to the UICC for use in accessing network functionalities. The UE 1100 then sends a registration complete message 855 back to the serving network 120, which sends a corresponding registration complete message 860 to the home network 140 to end the provisioning process 800.

Figure 9:
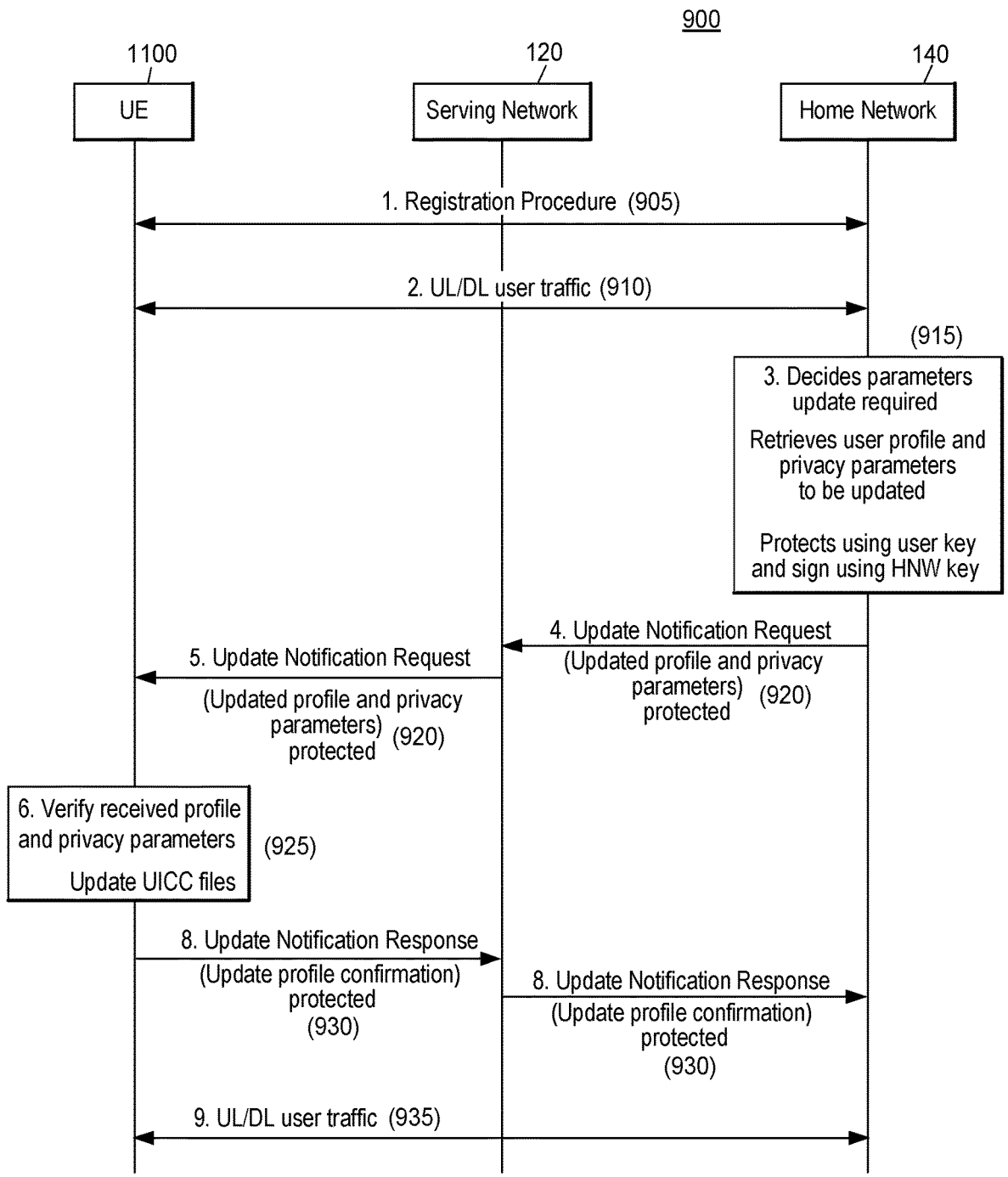
FIG. 9 illustrates a sequence diagram of a push update process for updating user privacy parameters by the home network using update notification request messages, with end-to-end security.

FIG. 9 illustrates a sequence diagram of a push update process 900 for updating user privacy parameters by the home network 140 with end-to-end security. The push update process 900 is similar to the provisioning and updating processes above, but the push update process 900 updates user privacy parameters within the UE 1100 after registration (e.g., in real-time as updates become available at the home network 140). Unlike existing OTA updating techniques, the push update process 900 is both secure and verifiable.

The push update process 900 begins with a registration procedure 905 to register the UE 1100 for communication with the home network 140 via the serving network 120. Registration may occur according to known techniques or using the registration techniques described elsewhere herein. Following registration, the UE 1100 communicates data with the home network 140 by sending and receiving upload (UL) and download (DL) user traffic 910. At some point during a user session following registration, the home network 140 determines an update to user privacy data (e.g., a user profile or privacy parameters) should be sent to the UE 1100 (block 915). In some embodiments, the AUSF 144 or UDM 142 of the home network 140 may determine an update to the user privacy data should be sent, for example by periodically checking whether an update is available or immediately provisioning an update when a user profile is updated on the home network 140. When an update to the user privacy data is identified, the home network 140 retrieves the corresponding updated user privacy data based upon the SUPI and protects the updated user privacy data for secure provisioning to the UE 1100 at block 915.

The home network 140 then sends the protected updated user privacy data to the UE 1100 via the serving network 120 in an update notification request message 920. The serving network 120 passes the protected updated user privacy data in the update notification message 920 to the UE 1100, without decrypted such updated user privacy data. Upon receiving the update notification request message 920, the UE 1100 decrypts the updated user privacy data from the update notification request message 920 and updates the user privacy data on the UICC (block 925). The UE 1100 may update previously stored user profile and privacy parameters with the updated user privacy data for further use, which may include provisioning the files to the UICC for use in accessing network functionalities. The UE 1100 then sends an update notification response message 930 back to the home network 140 via the serving network 120, which update notification response message 930 may also be protected for end-to-end security between the UE 1100 and the home network 140. Following confirmation of the update, the UE 1100 resumes communication with the home network 140 by sending and receiving UL and DL user traffic 935, completing the push update process 900.

Figure 10:
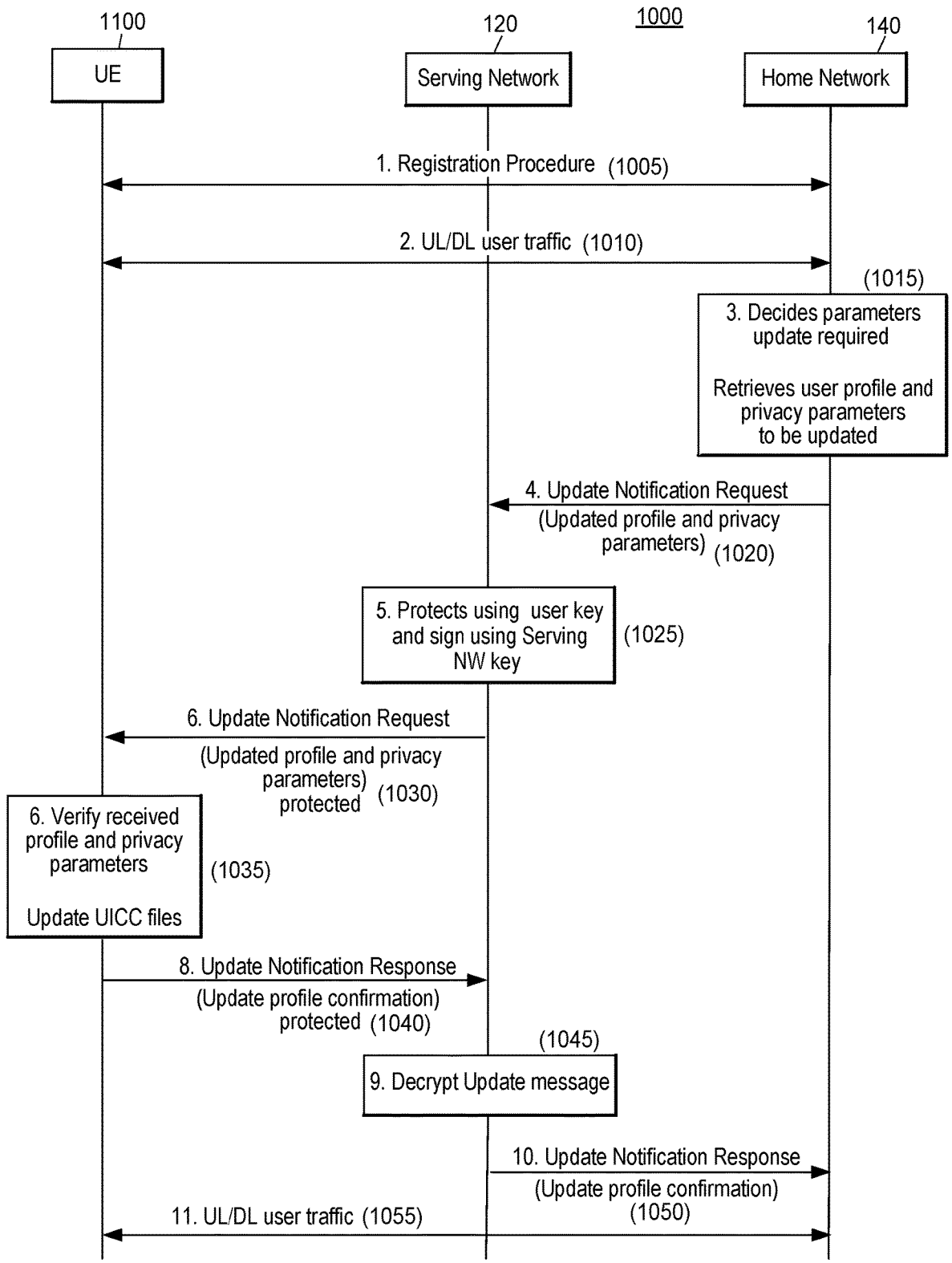
FIG. 10 illustrates a sequence diagram of a push update process for updating user privacy parameters by the home network using update notification request messages, with end-to-middle security.

FIG. 10 illustrates a sequence diagram of a push update process 1000 for updating user privacy parameters by the home network 140 with end-to-middle security. The push update process 1000 is similar to the push update process 900 but provides end-to-middle security, rather than end-to-end security. In contrast to the push update process 900 described above, the push update process 1000 provides for encryption and decryption by the serving network 120, rather than the home network 140. Thus, the user privacy data is protected between the UE 1100 and the serving network 120, but the serving network 120 and home network 140 communicate over communication channels that are otherwise secured between the VPLMN and the HPLMN. This may advantageously reduce the data communicated between the networks where the serving network 120 is a trusted network.

The push update process 1000 begins with a registration procedure 1005 to register the UE 1100 for communication with the home network 140 via the serving network 120, which may occur according to known techniques or using the registration techniques described elsewhere herein. Following registration, the UE 1100 communicates data with the home network 140 by sending and receiving UL and DL user traffic 1010. At some point during a user session following registration, the home network 140 determines an update to user privacy data (e.g., a user profile or privacy parameters) should be sent to the UE 1100 (block 1015). In some embodiments, the AUSF 144 or UDM 142 of the home network 140 may determine an update to the user privacy data should be sent, for example by periodically checking whether an update is available or immediately provisioning an update when a user profile is updated on the home network 140. When an update to the user privacy data is identified, the home network 140 retrieves the corresponding updated user privacy data based upon the SUPI for provisioning to the UE 1100 at block 1015.

The home network 140 then sends the updated user privacy data to the serving network 120 in an update notification request message 1020. Upon receiving the update notification request message 1020, the serving network 120 protects the updated user privacy data (block 1025) and sends the protected user privacy data to the UE 1100 in a secure update notification request message 1030. Upon receiving the update notification request message 1030, the UE 1100 decrypts the updated user privacy data from the update notification request message 1030 and updates the user privacy data on the UICC (block 1035). The UE 1100 may update previously stored user profile and privacy parameters with the updated user privacy data for further use, which may include provisioning the files to the UICC for use in accessing network functionalities. The UE 1100 then sends a secure update notification response message 1040 back to the serving network 120. The serving network 120 decrypts the secure update notification response message 1040 (block 1045) and sends a corresponding update notification response message 1050 to the home network 140. Following confirmation of the update, the UE 1100 resumes communication with the home network 140 by sending and receiving UL and DL user traffic 1055, completing the push update process 1000.

Figure 11:
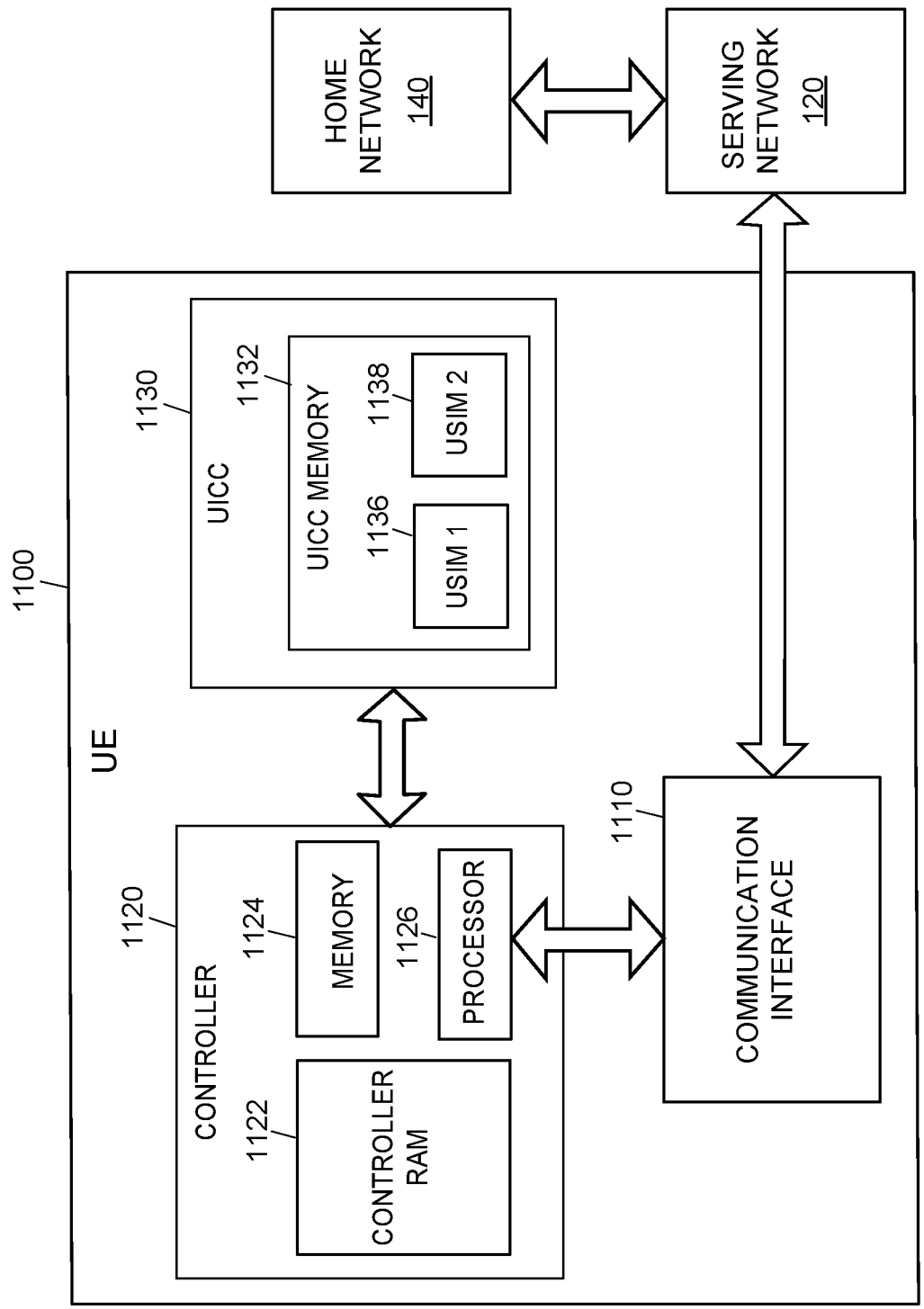
FIG. 11 illustrates a block diagram of an exemplary UE to be provisioned with privacy parameters.

FIG. 11 illustrates a block diagram of an exemplary UE 1100, which is communicatively connected to the serving network 120 and the home network 140. The UE 1100 may be a smart phone, a tablet device, or an Internet of Things IoT) device. The UE 1100 includes a controller 1120, with the controller including random access memory (RAM) 1122, non-transitory memory 1124, and a processor 1126. The non-transitory memory 1124 may store processor-executable instructions to perform parts of the various processes described herein when such processor-executable instructions are executed by the processor 1126, The UE 1100 also includes a communication interface 1110 for handling network communication with the serving network 120 and the home network 140. Each of the serving network 120 and the home network 140 comprises a plurality of network components (e.g., nodes, functions, and devices), which are well known and are described in relevant part above with respect to FIGS. 1 and 2. Each of such network components may be implemented in or include one or more controllers (not shown) storing and executing processor executable instructions to perform parts of the various processes described herein. Similar to the controller 1120 of the UE 1100, the controllers of the network components may each include one or more processors, a non-transitory memory storing processor-executable instructions, and RAM.

The UE 1100 further includes a Universal Integrated Circuit Card (UICC) 1130 that is used to store parameters and other information identifying the subscriber to various services. The UICC 1130 includes a UICC memory 1132, which is a non-transitory memory configured to store electronic data, such as service parameters and value-added parameters to enable the UE 1100 to access features or services of one or more networks or carrier services. The UICC memory 1132 may further store parameters for other carrier and third party services. In some embodiments, the UICC memory 1132 may further store processor-executable instructions to perform parts of the various processes described herein. Although not shown, the UICC 1130 may include further components according to configurations of UICCs known in the art. In the illustrated embodiment, the UICC memory 1132 contains two USIM applications 1136 and 1138. However, other configurations of SIM, USIM, ISIM, CSIM, or other similar applications may be included in alternative embodiments.

The UICC 1130 stores one or more user profiles, as well as privacy parameters, which may relate to various network or value-added services. To facilitate secure communication, the privacy parameters may include a Home Network Public Key, a SUPI associated with the user, a routing indicator, and a protection, scheme identifier. Such privacy parameters can be stored as part of the USIM applications 1136 and 1138 on the UICC 1130 using call flows supported by the already existing 3GPP protocols. Additional or alternative privacy parameters may be provisioned to and stored in the UICC 1130, such as a list of preferred network partners (referred to as a Preferred Roaming List in some networks), a list of pre-populated phone numbers for a customer mobile address book (e.g., an emergency phone number, a voicemail number, or a phone number for the operator's technical support), a preferred Short Message Service Center (SMSC number) or P-CSCF identifier, or parameters for non-telecommunication applications (e.g., payment credentials used for digital wallet services or identifiers needed for music, video, or other value-added services that require initial secure parameters for a secure log-on process). These and other types of privacy parameters, user profiles, or other user privacy data may be provisioned to the UE 1100 according to the techniques described herein.

To the extent that any term recited in the claims at the end of this disclosure is referred to in this disclosure in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based upon the application of 35 U.S.C. § 112(f).

Although individual operations of one or more methods are illustrated and described as separate operations, one or more of the individual operations may be performed concurrently, and nothing requires that the operations be performed in the order illustrated. Structures and components functionality presented as separate components in example configurations may be implemented as a combined structure or component. Similarly, structures and components functionality presented as a single component may be implemented as separate components. These and other variations, modifications, additions, and improvements fall within the scope of the subject matter herein.

This detailed description is to be construed as exemplary only and does not describe every possible embodiment, as describing every possible embodiment would be impractical, if not impossible. One could implement numerous alternate embodiments, using either current technology or technology developed after the filing date of this application. Upon reading this disclosure, those of skill in the art will appreciate still additional alternative structural and functional designs for systems and methods according to the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the techniques disclosed herein without departing from the spirit and scope defined in the appended claims.

What is claimed:

1. A system for securing user data in mobile communication networks, the system comprising:
   a wireless data communication interface communicatively coupled to a telecommunication network and configured for bidirectional communication with the telecommunication network, wherein the telecommunication network is a home network and wherein the wireless data communication interface is communicatively coupled to the telecommunication network via a serving network;
   one or more non-transitory storage media configured to store processor-executable instructions; and
   one or more processors operatively connected to the wireless data communication interface and the one or more non-transitory storage media, the one or more processors configured to execute the processor-executable instructions to cause the system to:
      send a network registration request message containing an encrypted subscriber permanent identifier to the telecommunication network via the wireless data communication interface as part of a registration procedure, wherein sending the network registration request message to the telecommunication network includes sending the network registration request message to the serving network in order to cause the serving network to: (i) generate an unencrypted subscriber permanent identifier from the encrypted subscriber permanent identifier from the network registration request message and (ii) communicate the unencrypted subscriber permanent identifier to the telecommunication network;
      receive a user profile and one or more privacy parameters within an encrypted and integrity protected message from the telecommunication network via the serving network and the wireless data communication interface during the registration procedure;
      extract and decrypt the one or more privacy parameters from the encrypted and integrity protected message;
      store the one or more privacy parameters and the user profile in the one or more non-transitory storage media to facilitate access to one or more network functionalities; and
      send a registration complete message to the telecommunication network via the wireless data communication interface after storing the one or more privacy parameters in the one or more non-transitory storage media.

2. The system of claim 1, wherein the encrypted and integrity protected message is a registration response message.

3. The system of claim 1, wherein the encrypted and integrity protected message is a registration acceptance message.

4. The system of claim 1, wherein the user profile and the one or more privacy parameters contain updated user privacy data, and wherein storing the one or more privacy parameters in the one or more non-transitory storage media updates one or more previously stored privacy parameters.

5. The system of claim 1, wherein the one or more privacy parameters comprise a preferred partner list for roaming network access.

6. The system of claim 1, wherein the one or more privacy parameters comprise parameters necessary for provisioning value-added services comprising one or more of the following: a user phone book entry, on demand music services, on demand video services, or digital wallet services.

7. A method for securing user data in mobile communication networks, comprising:
receiving, at one or more components of a telecommunication network, a network registration request message containing a subscriber permanent identifier associated with a user equipment as part of a registration procedure, wherein the telecommunication network is a home network and the network registration request message is received in an unencrypted form from a serving network;
extracting, by the one or more components of the telecommunication network, the subscriber permanent identifier;
retrieving, by the one or more components of the telecommunication network, a user profile and one or more privacy parameters based upon the subscriber permanent identifier;
sending, by the one or more components of the telecommunication network, the user profile and the one or more privacy parameters to the user equipment to cause the user equipment to store the user profile and the one or more privacy parameters to facilitate access to one or more network functionalities, wherein the user equipment receives the user profile and the one or more privacy parameters in an encrypted and integrity protected message during the registration procedure and wherein sending the user profile and the one or more privacy parameters to the user equipment includes sending the user profile and the one or more privacy parameters to the serving network in an unencrypted and unprotected form in order to cause the serving network to: (i) generate the encrypted and integrity protected message including the user profile and the one or more privacy parameters and (ii) communicate the encrypted and integrity protected message to the user equipment and
receiving, by the one or more components of the telecommunication network via the serving network, a registration complete message from the user equipment.

8. The method of claim 7, wherein the encrypted and integrity protected message is a registration response message.

9. The method of claim 7, wherein the encrypted and integrity protected message is a registration acceptance message.

10. The method of claim 7, wherein the one or more privacy parameters comprise parameters necessary for provisioning value-added services comprising one or more of the following: a user phone book entry, on demand music services, on demand video services, or digital wallet services.

11. The method of claim 7, wherein the one or more components of the telecommunication network comprise one or more of a Unified Data Management component or an Authentication Server Function.

12. The method of claim 7, wherein the user profile and the one or more privacy parameters contain updated user privacy data.

13. The method of claim 7, wherein the one or more privacy parameters comprise a preferred partner list for roaming network access.

14. A method for securing user data in mobile communication networks, comprising:
registering, by one or more components of a telecommunication network, a user equipment by a registration procedure using a subscriber permanent identifier associated with the user equipment, wherein the telecommunication network is a home network;
determining, by the one or more components of the telecommunication network, an update to one or more privacy parameters associated with the subscriber permanent identifier is available after completion of the registration procedure;
retrieving, by the component of the telecommunication network, an updated user profile and one or more updated privacy parameters based upon the subscriber permanent identifier;
sending, by the component of the telecommunication network, the updated user profile and the one or more updated privacy parameters to the user equipment to cause the user equipment to store the updated user profile and the one or more updated privacy parameters to facilitate access to one or more network functionalities, wherein the user equipment receives the updated user profile and the updated one or more privacy parameters in an encrypted and integrity protected message and wherein sending the updated user profile and the one or more updated privacy parameters to the user equipment comprises sending the updated user profile and the one or more updated privacy parameters to a serving network in an unencrypted and unprotected form in order to cause the serving network to: (i) generate the encrypted and integrity protected message including the updated user profile and the one or more updated privacy parameters and (ii) communicate the encrypted and integrity protected message to the user equipment; and
receiving, by the component of the telecommunication network via the serving network, an update confirmation from the user equipment.

15. The method of claim 14, wherein:
the encrypted and integrity protected message is an update notification request message; and
receiving the update confirmation comprises receiving an update notification response message.

16. The method of claim 14, wherein the one or more privacy parameters comprise parameters necessary for provisioning value-added services comprising one or more of the following: a user phone book entry, on demand music services, on demand video services, or digital wallet services.

17. The method of claim 14, wherein the one or more privacy parameters comprise a preferred partner list for roaming network access.

18. The method of claim 14, wherein the one or more components of the telecommunication network comprise one or more of a Unified Data Management component or an Authentication Server Function.

* * * * *